US008060364B2

(12) United States Patent
Bachar et al.

(10) Patent No.: US 8,060,364 B2
(45) Date of Patent: Nov. 15, 2011

(54) APPARATUS AND METHOD FOR EVENT-DRIVEN CONTENT ANALYSIS (75) Inventors: Aviv Bachar, Cresskill, NJ (US); Shay Gabay, Kadima (IL)

(73) Assignee: Nice Systems, Ltd., Raanana (IL)

( * ) Notice: Subject to any disclaimer, the term of this patent is extended or adjusted under 35 U.S.C. 154(b) by 1446 days.

(21) Appl. No.: 10/706,282

(22) Filed: Nov. 13, 2003

(65) Prior Publication Data

US 2005/0108775 A1     May 19, 2005

(51) Int. Cl.
G10L 15/00 (2006.01)
(52) U.S. Cl. .................. 704/231; 348/143; 348/222.1; 360/13; 370/232; 370/352; 370/468; 379/134; 379/202.01; 379/265.02; 379/265.03; 379/265.11; 379/32.01; 379/67.1; 379/88.14; 379/88.22; 382/190; 455/186.1; 455/452.2; 704/201; 704/207; 704/270; 704/251; 705/2; 705/26; 707/100; 709/217; 715/723
(58) Field of Classification Search .................. 370/352, 370/232, 468; 725/151, 13; 707/100; 379/265.03, 379/88.22, 202, 134, 202.1, 265.01, 265.02, 379/265.11, 32.01, 67.1, 88.14; 705/26, 705/2; 718/104; 704/270, 231, 207, 251, 704/201; 348/143, 222.1; 360/13; 382/190; 455/186.1, 452.2; 709/217; 715/723
See application file for complete search history.

(56) References Cited

U.S. PATENT DOCUMENTS

| | | | |
|---|---|---|---|
| 4,145,715 A | 3/1979 | Clever | |
| 4,351,007 A * | 9/1982 | Youngquist | ..................... 360/13 |
| 4,527,151 A | 7/1985 | Byrne | |
| 4,821,118 A | 4/1989 | Lafreniere | |
| 5,051,827 A | 9/1991 | Fairhurst | |
| 5,091,780 A | 2/1992 | Pomerleau | |
| 5,303,045 A | 4/1994 | Richards et al. | |
| 5,307,170 A | 4/1994 | Itsumi et al. | |
| 5,353,618 A | 10/1994 | Crick | |
| 5,404,170 A | 4/1995 | Keating | |
| 5,491,511 A | 2/1996 | Odle | |
| 5,519,446 A | 5/1996 | Lee | |
| 5,734,441 A | 3/1998 | Kondo et al. | |
| 5,742,349 A | 4/1998 | Choi et al. | |
| 5,748,775 A * | 5/1998 | Tsuchikawa et al. | ......... 382/190 |
| 5,751,346 A | 5/1998 | Dozier et al. | |
| 5,790,096 A | 8/1998 | Hill, Jr. | |
| 5,796,439 A | 8/1998 | Hewett et al. | |

(Continued)

FOREIGN PATENT DOCUMENTS

DE          103 58 333 A1      7/2005

(Continued)

OTHER PUBLICATIONS

NiceVision— Secure your Vision, a prospect by NICE Systems, Ltd.
NICE Systems announces New Aviation Security Initiative, reprinted from Security Technology & Design.
(Hebrew) "the Camera That Never Sleeps" from Yediot Aharonot.
Freedman, I. Closing the Contact Center Quality Loop with Customer Experience Management, Customer Interaction Solutions, vol. 19, No. 9, Mar. 2001.
PR Newswire, NICE Redefines Customer Interactions with Launch of Customer Experience Management, Jun. 13, 2000.

(Continued)

*Primary Examiner* — Michael Colucci
(74) *Attorney, Agent, or Firm* — Ohlandt, Greeley, Ruggiero & Perle, L.L.P.

(57) ABSTRACT

An apparatus and method for the event-driven analysis of media contents derived from customer interactions is disclosed. Content analysis is executed exclusively on those segments of the interaction media that are relevant in a given context. The steps of the analysis are carried out either in a static or dynamic manner where less demanding on resources analysis type is performed prior to more demanding analysis type.

31 Claims, 3 Drawing Sheets

U.S. PATENT DOCUMENTS

| | | | |
|---|---|---|---|
| 5,847,755 | A | 12/1998 | Wixson et al. |
| 5,895,453 | A | 4/1999 | Cook et al. |
| 5,918,213 | A * | 6/1999 | Bernard et al. ............... 705/26 |
| 5,918,222 | A * | 6/1999 | Fukui et al. ............... 1/1 |
| 5,920,338 | A | 7/1999 | Katz |
| 5,922,047 | A * | 7/1999 | Newlin et al. ............... 709/217 |
| 6,014,647 | A | 1/2000 | Nizzar et al. |
| 6,028,626 | A | 2/2000 | Aviv et al. |
| 6,031,573 | A | 2/2000 | MacCormack et al. |
| 6,037,991 | A | 3/2000 | Thro et al. |
| 6,070,142 | A | 5/2000 | McDonough et al. |
| 6,081,606 | A | 6/2000 | Hansen et al. |
| 6,092,197 | A | 7/2000 | Coueignoux |
| 6,094,227 | A | 7/2000 | Guimier |
| 6,097,429 | A | 8/2000 | Seeley et al. |
| 6,111,610 | A | 8/2000 | Faroudja |
| 6,134,530 | A | 10/2000 | Bunting et al. |
| 6,138,139 | A | 10/2000 | Beck et al. |
| 6,167,395 | A | 12/2000 | Beck et al. |
| 6,170,011 | B1 | 1/2001 | Beck et al. |
| 6,212,178 | B1 | 4/2001 | Beck |
| 6,230,197 | B1 | 5/2001 | Beck et al. |
| 6,295,367 | B1 | 9/2001 | Crabtree et al. |
| 6,327,343 | B1 | 12/2001 | Epstein et al. |
| 6,330,025 | B1 | 12/2001 | Arazi et al. |
| 6,332,143 | B1 * | 12/2001 | Chase ............... 707/100 |
| 6,345,305 | B1 | 2/2002 | Beck et al. |
| 6,404,857 | B1 * | 6/2002 | Blair et al. ............... 379/67.1 |
| 6,426,771 | B1 * | 7/2002 | Kosugi ............... 348/222.1 |
| 6,427,137 | B2 | 7/2002 | Petrushin |
| 6,441,734 | B1 | 8/2002 | Gutta et al. |
| 6,539,087 | B1 * | 3/2003 | Walsh et al. ............... 379/202.01 |
| 6,549,613 | B1 | 4/2003 | Dikmen |
| 6,559,769 | B2 | 5/2003 | Anthony et al. |
| 6,570,608 | B1 | 5/2003 | Tserng |
| 6,604,108 | B1 | 8/2003 | Nitahara |
| 6,628,835 | B1 | 9/2003 | Brill et al. |
| 6,704,409 | B1 | 3/2004 | Dilip et al. |
| 6,724,887 | B1 * | 4/2004 | Eilbacher et al. ............... 379/265.03 |
| 6,745,221 | B1 * | 6/2004 | Ronca ............... 718/104 |
| 6,760,697 | B1 * | 7/2004 | Neumeyer et al. ............... 704/201 |
| 6,798,786 | B1 * | 9/2004 | Lo et al. ............... 370/468 |
| 6,823,054 | B1 * | 11/2004 | Suhm et al. ............... 379/134 |
| 6,859,776 | B1 * | 2/2005 | Cohen et al. ............... 704/270 |
| 6,879,685 | B1 * | 4/2005 | Peterson et al. ............... 379/265.11 |
| 6,898,277 | B1 * | 5/2005 | Meteer et al. ............... 379/265.02 |
| 6,917,610 | B1 * | 7/2005 | Kung et al. ............... 370/352 |
| 6,937,706 | B2 * | 8/2005 | Bscheider et al. ............... 379/88.22 |
| 7,003,079 | B1 * | 2/2006 | McCarthy et al. ............... 379/32.01 |
| 7,058,376 | B2 * | 6/2006 | Logan et al. ............... 455/186.1 |
| 7,076,427 | B2 | 7/2006 | Scarano et al. |
| 7,103,806 | B1 | 9/2006 | Horvitz |
| 7,606,701 | B2 * | 10/2009 | Degani et al. ............... 704/207 |
| 2001/0043697 | A1 | 11/2001 | Cox et al. |
| 2001/0052081 | A1 | 12/2001 | McKibben et al. |
| 2002/0005898 | A1 | 1/2002 | Kawada et al. |
| 2002/0010705 | A1 | 1/2002 | Park et al. |
| 2002/0059283 | A1 | 5/2002 | Shapiro et al. |
| 2002/0087385 | A1 | 7/2002 | Vincent |
| 2002/0093913 | A1 * | 7/2002 | Brown et al. ............... 370/232 |
| 2002/0194002 | A1 * | 12/2002 | Petrushin ............... 704/270 |
| 2003/0059016 | A1 | 3/2003 | Lieberman et al. |
| 2003/0106072 | A1 * | 6/2003 | Soundararajan ............... 725/151 |
| 2003/0128099 | A1 | 7/2003 | Cockerham |
| 2003/0163360 | A1 | 8/2003 | Galvin |
| 2004/0001437 | A1 * | 1/2004 | Duncan et al. ............... 370/232 |
| 2004/0062364 | A1 * | 4/2004 | Dezonno et al. ............... 379/88.14 |
| 2004/0083099 | A1 * | 4/2004 | Scarano et al. ............... 704/231 |
| 2004/0098295 | A1 | 5/2004 | Sarlay et al. |
| 2004/0141508 | A1 | 7/2004 | Schoeneberger et al. |
| 2004/0161133 | A1 | 8/2004 | Elazar et al. |
| 2004/0249650 | A1 | 12/2004 | Freedman et al. |
| 2005/0030374 | A1 * | 2/2005 | Goldenberg et al. ............... 348/143 |
| 2005/0064873 | A1 * | 3/2005 | Karaoguz et al. ............... 455/452.2 |
| 2005/0091094 | A1 * | 4/2005 | Wilson ............... 705/7 |
| 2005/0132293 | A1 * | 6/2005 | Herberger et al. ............... 715/723 |
| 2005/0204378 | A1 * | 9/2005 | Gabay ............... 725/13 |
| 2005/0238000 | A1 * | 10/2005 | Pollock et al. ............... 370/352 |
| 2006/0093135 | A1 | 5/2006 | Fiatal et al. |

FOREIGN PATENT DOCUMENTS

| | | |
|---|---|---|
| EP | 1 484 892 A2 | 8/2004 |
| GB | 9916430.3 | 7/1999 |
| WO | WO 95 29470 A | 11/1995 |
| WO | WO 98 01838 A | 1/1998 |
| WO | WO 00/73996 | 12/2000 |
| WO | WO 01/52510 | 7/2001 |
| WO | WO 02/37856 | 5/2002 |
| WO | WO 03 013113 A2 | 2/2003 |
| WO | WO 03/067360 A2 | 8/2003 |
| WO | WO 03 067884 A1 | 8/2003 |
| WO | WO 2004/091250 | 10/2004 |

OTHER PUBLICATIONS

PR Newswire, Recognition Systems and Hyperion to Provide Closed Loop CRM Analytic Applications, Nov. 17, 1999.

Financial companies want to turn regulatory burden into competitive advantage, Feb. 24, 2003, printed from InformationWeek, http://www.informationweek.com/story/IWK20030223S0002.

Sedor—Internet pages form http://www.dallmeier-electronic.com.

(Hebrew) print from Haaretz, "The Computer at the Other End of the Line", Feb. 17, 2002.

Q. Chen et al., A Data-Warehouse/OLAP Framework for Scalable Telecommunication Tandem Traffic Analysis, qchen,mhsu,dayal@hpl.hp.com.

Sertainty, Automated Quality Monitoring—SER Solutions, Inc. , 21680 Ridgetop Circle Dulles, VA, www.ser.com.

Sertainty, Agent Performance Optimization—SER Solutions, Inc., 2005 SE Solutions, Inc., www.ser.com.

Lawrence P. Mark, White Paper—Sertainty Automated Quality Assurance, 2003-2005, SER Solutions, Inc., 2005 SE Solutions, Inc., www.ser.com.

Douglas A. Reynolds, et al., Robust Text-Independent Speaker Identification Using Gaussian Mixture Speaker Models, Jan. 1995, 70 pp. 72-83, vol. 3, No. 1, IEEE Transactions on Speech and Audio Processing.

Upendra V. Chaudhari, et al., Very Large Population Text-Independent Speaker Identification Using Transformation Enhanced Multi-Grained Models, IBM T.J. Research Center, Rt. 134, Yorktown Heights, NY 10598. email: uvc@us.ibm.com.

Douglas A. Reynolds, et al., Speaker Verification Using Adapted Gaussian Mixture Models, Digital Signal Processing, Jan./Apr./Jul. 2000, pp. 19-41, vol. 10, Nos. 1-3, M.I.T. Lincoln Laboratory, 244 Wood St., Lexington, Massachusetts 02420, email: dar@sst.II.mit.edu.

Yaniv Zigel, et al., How to Deal with Multiple-Targets in Speaker Identification Systems?, Nice Systems Ltd., Audio Analysis Group, P.O.B. 690 Ra'anana 43107, Israel, vanivz@nice.com.

Frederic Bimbot, et al., A Tutorial on Text-Independent Speaker Verification, EURASIP Journal on Applied Signal Processing, Aug. 8, 2003, pp. 430-451, Hindawi Publishing Corporation.

Yeshwant K.Muthusamy, et al., Reviewing Automatic Language Identification, IEEE Signal Processing Magazine, Oct. 1994, pp. 33-41.

Marc A. Zissman, Comparison of Four Approaches to Automatic Language Identification of Telephone Speech, IEEE Transactions on Speech and Audio Processing, Jan. 1996, pp. 31-44, vol. 4, No. 1.

N. Amir S. Ron, Towards an Automatic Classification of Emotions in Speech, Communications Engineering Department Center for Technological Education Holon 52 Golomb st. Holon 58102, Isreal, naomoto@wine.chet.ac.il.

European Office Action dated Aug. 20, 2010 for corresponding European Patent Application No. 03818954.4-2414.

* cited by examiner

APPARATUS AND METHOD FOR EVENT-DRIVEN CONTENT ANALYSIS

CROSS REFERENCE TO RELATED APPLICATIONS

The present invention is related to PCT Patent application titled METHOD, APPARATUS AND SYSTEM FOR CAPTURING AND ANALYSING INTERACTION BASED CONTENT serial number PCT/IL02/00593 filed Jul. 18, 2002, which is incorporated herein by reference.

STATEMENT REGARDING SPONSORED RESEARCH OR DEVELOPMENT

Not Applicable.

REFERENCE TO SEQUENCE LISTING

Not Applicable.

BACKGROUND OF THE INVENTION

1. Field of the Invention

The present invention relates to an apparatus and method for content analysis in general, and more particularly to an apparatus and method for event-driven content analysis.

2. Description of Related Art

Businesses increasingly consider their interactions with customers as a major source for information and insight about the customers, and about their business operations. An interaction comprise of information captured by various means when communicating with a customer or another third party. Paradoxically, however, interaction details transferred in voice, and other media forms of interactions, are largely lost in the sea of interaction volume. Currently, only a small segment of the contents exchanged in these interactions is played back and exploited, and an even smaller fraction is listened to in real-time. Thus, the vast majority of the available information embedded in the interactions is not used. In order to extract meaningful information from the potentially overwhelming amounts of interaction data a structured approach is required that would provide proper interaction data management, with suitable processes operative in the development of a finely-tuned content filtering mechanism, and with the suitable tools to provide for data qualification, data tagging and data sorting.

One drawback of the current content analysis methods concerns the complexity of the analysis. Analyzing content interactions, in order to extract meaningful data, is a computing resource intensive and time consuming computation. As a result not all the interactions can be analyzed and the interactions that do get analyzed are often processed with a substantial delay, such that at times the results produced by the analysis could be made unusable. Another drawback of the current content analysis methods is the inaccuracy of the analysis results. The presently available analysis methods typically produce results that often suffer from inferior detection rates and high false alarms rates.

BRIEF SUMMARY OF THE INVENTION

One aspect of the present invention regards an apparatus for event-driven content analysis. The apparatus comprises the following elements: a media type selector component to identify and to select the type of interaction media inputted for analysis from an at least one interaction recording or storing device into the content analyzer apparatus, a pivot spot definer component to mark an at least one precise position in the interaction media to indicate the occurrence of an at least one pre-defined meta-data event or an at least one pre-defined interaction data item, a region of interest definer component to calculate the limits of at least one segment of the interaction data in accordance with the location of the pivot spot, a content analysis input selector component to determine an at least one input for an at least one analyzer component in order to provide optimized performance of the analyzer component, and a content analysis inputs table to hold in storage the at least one selectable input value.

A second aspect of the present invention regards a media content analyzer method for event-driven media content analysis. The method comprises the following steps: selecting an interaction media to analyze, marking an at least one pivot spot on the interaction media to provide a base location for the generation of the limits of an at least one segment of the of the interaction media, defining the limits of at least one segment of the interaction media to provide an at least one interaction data segment to analyze, sequencing an ordered series of analysis instruction steps to be executed in accordance with pre-defined program logic in association with the resource-using intensity and the time-consuming characteristics of the analysis component associated with the analysis instruction steps, selecting at least one input to an at least one content analysis step to provide for optimized performance of the analysis step, and executing an at least one analysis instruction step to perform an associated analysis component. The media could be audio, video and other multi-media.

DETAILED SUMMARY OF THE INVENTION

The present invention will be understood and appreciated more fully from the following detailed description taken in conjunction with the drawings in which.

DETAILED DESCRIPTION OF THE INVENTION

A novel apparatus and method for analyzing media contents derived from customer and third party interactions is disclosed. The proposed apparatus and method are designed to overcome the disadvantages of the prior art. An interaction is a communication unit through which content is passed, transferred, or exchanged. The interaction can be a telephone conversation, audio, video, voice over IP (VoIP), data packets, screen events, chat messages, text, survey results, quality management forms results, collaborative browsing results, email messages or any other encoded data. The present invention proposes a new apparatus and method for analyzing interactions utilizing media or multi-media content in order to make available the option to an organization to analyze selectively specific segments of the media as opposed to the currently available technologies that typically analyze the entire media. Media refers to audio, video or other media, including a combination of more than one media, which is refereed to as multi-media. The terms media and multi-media are used interchangeably although person skilled in the art will appreciate that multi-media is comprised of more than one type of media. The present invention relates to one or more types of media.

The key concept on which the present invention is based is the performance of an analysis focused exclusively on segments of the media that are relevant in a given context. The context is predetermined according to predetermined events, such as computer telephony interface events or other external events. Each segment of the media is defined as the Region of Interest. The Region of Interest is a part of the interaction selected according to predetermined rules. The analysis is performed while being aware of the fact that certain types of analysis are substantially less demanding on computer resources than certain other types of analysis. The steps of the analysis are carried out in a specific order and direction where the steps are arranged from the less demanding analysis type to the most demanding analysis type. Thus, a resource usage-efficient and time-efficient analysis process is achieved. The analysis process optimizes the utilization of the resource expensive computing resources in order to extract the most valuable and the most relevant data, utilizing minimal resources and providing maximum accuracy. Whenever possible less resource expensive analysis tests will be used in lieu of resource cheap tests to optimize the selected region so that resource expensive tests will be used on the more "interesting" segments selected for analysis. The present invention utilizes multiple data sources that can be used to determine the Region of Interest. The concept of Region of Interest is defined as specific segments of interaction media through which the interaction is performed and that can be analyzed in order to extract meaningful and useful interaction data to an organization. Thus, the Region of Interest is a partial section of the interaction media, and can have a relatively short length compared to the length of the complete interaction media. The Region of Interest can be a selected section within a phone call, or a selected part of a video stream or a combination thereof. It can also include parts of e-mails, presentations, communications of various kinds and the like. The term region of interest further denotes that selection of a part of the interaction to be analyzed and further optimized to be further analyzed.

Figure 1:
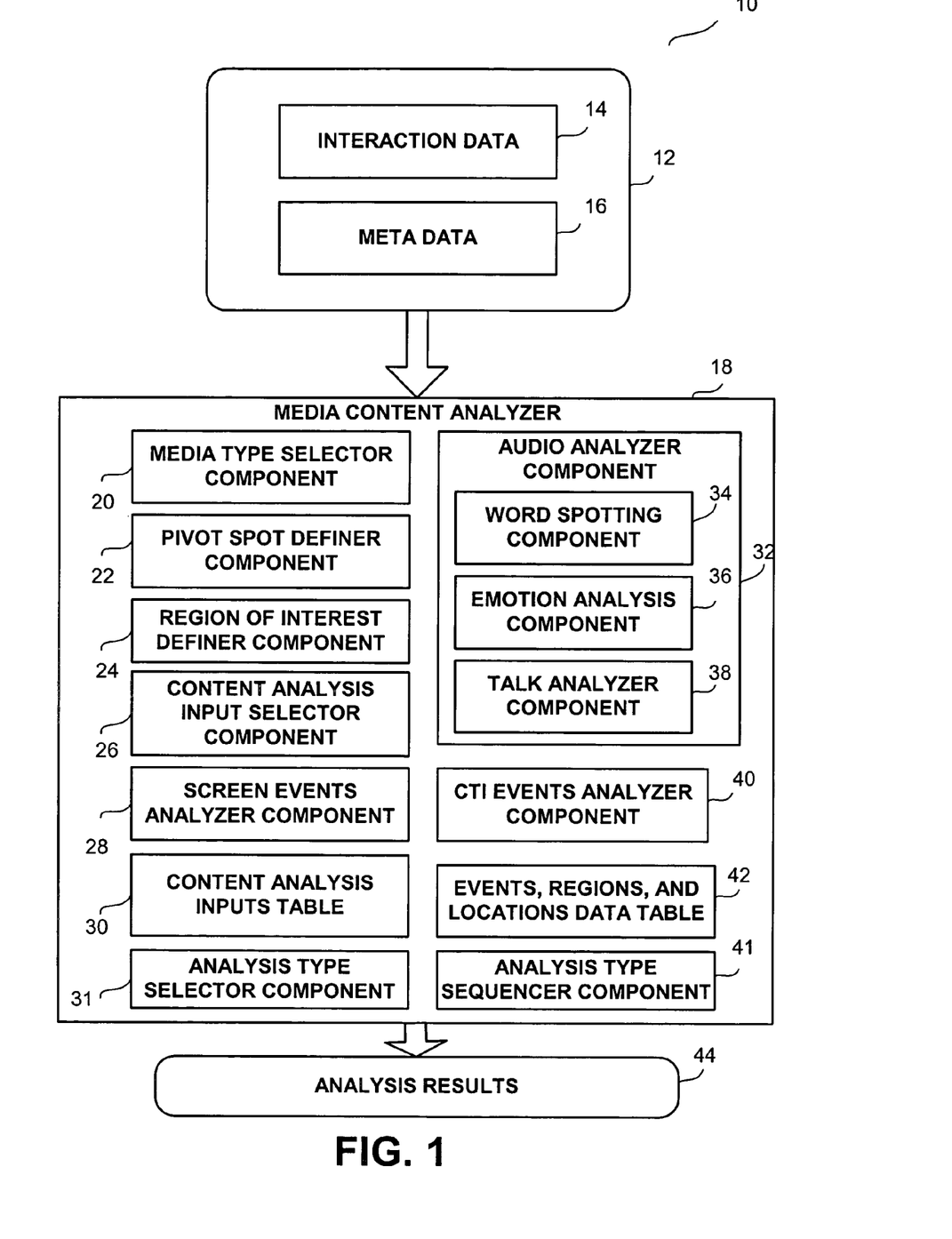
FIG. 1 is a schematic illustration of the proposed apparatus, in accordance with a preferred embodiment of the present invention.

Referring now to FIG. 1 the apparatus of the proposed invention includes a media content analyzer 18. The analyzer 18 is a set of computer programs and associated data structures that could be installed and operate in a computing device. The analyzer 18 includes a media selector component 20, a pivot spot definer component 22, a Region of Interest definer component 24, an analysis input selector component 26, a screen event analyzer component, an audio analyzer component 34, a Computer Telephony Interface (CTI) analyzer component 40, a content analysis input table 30, and an interaction events, regions, and location data table 42. The audio analyzer component preferably includes a word spotting component 34, an emotion analysis component 36 and a talk analyzer component 38. The audio analyzer may include other or like components for the analysis of audio media. The analyzer 18 is fed by data sources generated during the interaction 12. The usable data sources provided by the interaction 12 include but are not limited to Interaction data 14 and meta-data 16: The interaction 12 is a communication unit through which content data 14 is passed or exchanged. The interaction can be a telephone conversation, audio, video, voice over IP, data packets, screen events, emails, chat messages, text, and survey results, quality management forms results, collaborative browsing results, email messages or any other coded data 14. The meta-data 16 is information related to the interaction information and passed over a media along with the interaction data 14. Each interaction data 14 is accompanied with associated meta-data 16. The interaction data 14 and the associated meta-data 16 are the primary input to the analyzer 18. The interaction data 14 and the associated meta-data 16 may originate either internally or externally to the apparatus. The interaction data 14 and the associated meta-data 16 may also originate either internally or externally to the organization. The results of the analysis 44 performed by the analyzer 18 are stored and could be accessed in order to structure and display specific queries and reports.

A primary, but not exclusive, source for the provision of information about the interaction 12 is the CTI output. CTI provides for the management of telephone calls via the use of computing devices. The CTI can provide a multitude of information about telephone calls and the call participants, including but not limited to technical data, such as the length of the call, the calling number, the extension number, the agent ID, the customer ID, and the like. CTI can be extensively used to obtain important information that could be utilized usefully by the apparatus and method proposed by the present invention. CTI provides substantially accurate information and therefore is used as a primary source of information by the proposed apparatus and method. One non-limiting example involves the CTI event that is designated formally as the "hold" event. "Hold" indicates a specific event in which an agent participating in a telephone interaction with a customer puts the participating customer on hold, such that the customer is obliged to wait while the agent is performing other tasks. The "hold" event is used extensively in the following examples as it is an important factor in customer-handling procedures and rules.

The apparatus and method proposed by the present invention provides the option for the performance of a plurality of analysis types that can be performed on the interaction data 14. The analysis types include but are not limited to 1) Audio Analysis performed by the audio analyzer component 32 of FIG. 1. The Audio Analysis capabilities are divided into three main options: a) Word Spotting performed by the word spotting component 34 of FIG. 1, b) Emotion Analysis performed by the emotion analysis component 36 of FIG. 1, and c) Talk Analysis performed by the talk analyzer component 38 of FIG. 1. Word Spotting works at several levels starting from specific keyword detection, such as for example, "Warranty," and "Network," through short key phrases such as "Thank you," or "Service contract," to higher level phrases such as, for example, "How may I help you," and "It's not working." Emotion Analysis assesses the effect of stress and excitement on the voices that speakers participating in an interaction articulate. The process is customizable and tunable to specific environments. Talk Analysis identifies specific patterns from the ordinary speech patterns, such as for example, identifying that the agent verbally interrupted the speech of the customer, identifying that the customer verbally interrupted the speech of the agent, sensing unusually long silence periods, identifying the speaker who is dominant in the interaction, and the like. Optionally Automatic Transcription could be used in order to translate the speech elements within the media to text. Text Analysis examines natural-language text documents and extracts subjects of discussion, such as "Problems in Laser Printer usage." The utilization of the above-described methods separately or in combination could provide the option to a content-analyzing system to achieve substantial understanding and insight concerning the day-by-day management of the customer relationship. 2) CTI Analysis performed by the CTI analyzer component 40 of FIG. 1. Collecting and analyzing CTI events can provide the ability to access information that currently available analysis methods do not provide. The addition of the CTI information enriches the knowledge regarding the experience of the customer and enables an enhanced understanding concerning the actual course of the interactions. The proposed apparatus and method are operative in the collection of the CTI events, and in the transformation of the collected events into quantifiable information. Subsequently, the information is analyzed and reports and queries are generated from the results of the analysis. A non-limiting example is the analysis of the transfer CTI event. The "transfer" event refers to a transfer operation performed on a telephone conversation. The analysis could provide precise knowledge concerning the average number of the transfer CTI events that occur during an interaction. The result would enable the creation of an important performance factor. 3) Screen Events Analysis performed by the screen event analyzer component 28 of FIG. 1. Screen events are based entirely on what takes place on an agent's display screen. Screen events may be used as triggers to other actions whenever an event of choice takes place. Interactions are tagged with the event, enabling ready search, retrieval and evaluation of the calls. One non-limiting example of a screen event analysis involves the capturing of a field displayed on the agent's screen that indicates the change of status of a user account. For example, when the account status changes from "Active," to "Inactive," an event is generated and recorded to a database. All the events can be analyzed a later stage to create a report. Persons skilled in the art will appreciate the like events and analysis which can be performed in the context of the present invention.

Figure 2:
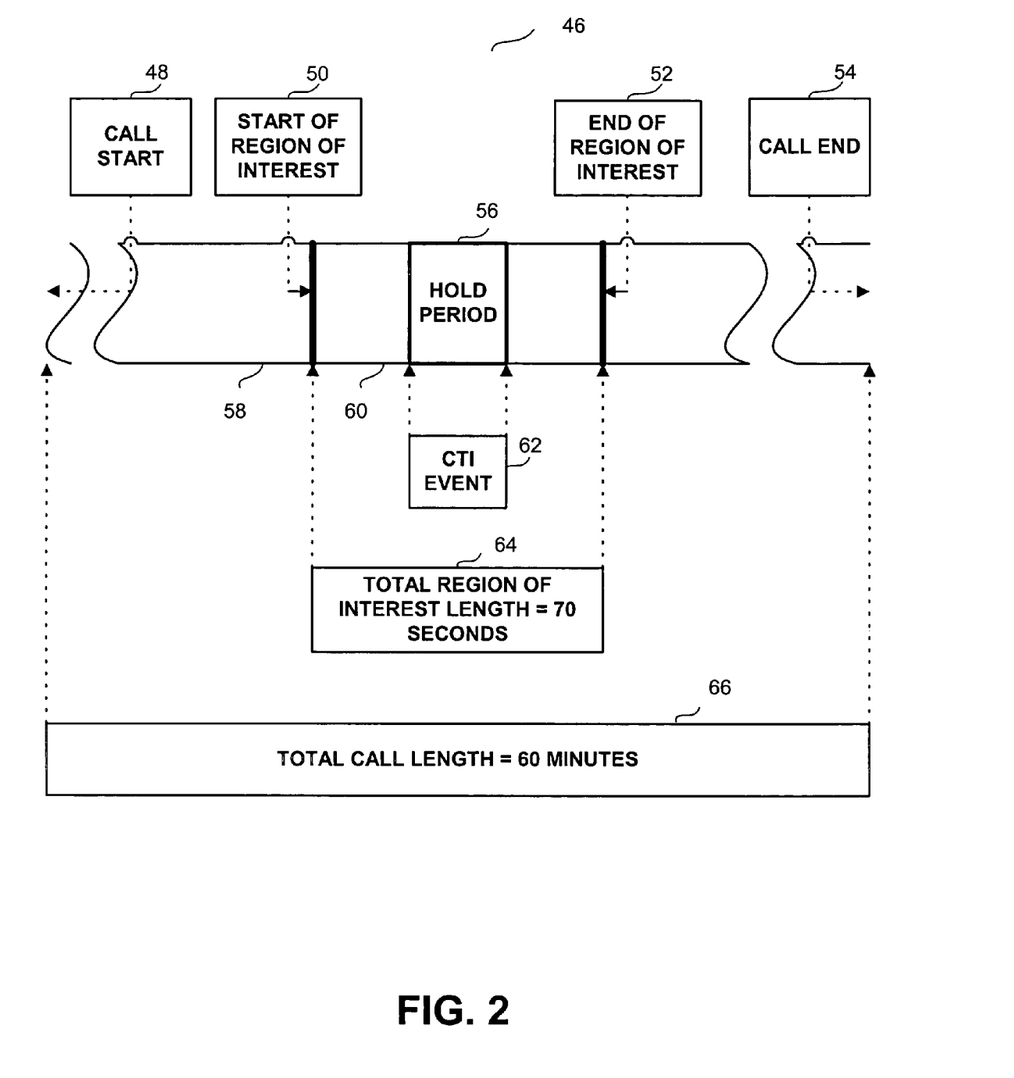
FIG. 2 is a graphic representation showing an exemplary region of interest in an interaction and the constituent periods, control points and relative length thereof along a time axis of a call, in accordance with a preferred embodiment of the present invention.

Referring now to FIG. 2 showing a graphic representation of an exemplary region of interest in an interaction and the constituent periods, control points and relative length thereof along a time axis of a call, The Region of Interest is defined as that segment of the interaction media that is analyzed in order to extract meaningful and useful information for the organization. The Region of Interest can be substantially short in length on the time axis of the ongoing interaction relative to the full length of the entire interaction media on the time axis. The interaction 12 of FIG. 1 is an exemplary telephone call performed between two participants. The telephone call will be referred to herein after as the "call". The call is operative in transmitting audio content, such as encoded speech and telephony control data (meta-data) between the participants. On the time axis 58 the exemplary call begins at the call start point 48 and terminates at the call end point 54. The total call length 66 is the length of the period between points 48 and 54. As clearly pointed out on the drawing under discussion the total call length 66 of the exemplary call is about 60 minutes. The length of the call can be shorter or longer. The call period 66 could include one or more CTI events. One exemplary CTI event 62 designates a CTI "hold" period 56. The proposed apparatus and method capture the hold event, creates a pivot spot based on the hold event, generate a hold period 56 and generate a Region of Interest period 60 around the hold period 56. It is clearly indicated that the exemplary Region of Interest 60 is limited by the start Region of Interest point 50 and by the end of Region of Interest point 52. It is further indicated that the total length of the Region of Interest 64 is 70 seconds. The Region of Interest can be longer or shorter. It can be a few milliseconds or it can be several minutes or more. Although on the drawing under discussion the graphical indications of the various periods are not according to scale it should be noted that the Region of Interest period 60 is substantially smaller in length relative to the entire period of the call 58. The ratio of the Region of Interest period to the Call period is about 1:60. The ratio of the Region of Interest can be smaller or larger and it is made clear that no limitation is placed on the ratio except such that the ratio should be different than 1:1. Thus, analyzing the Region of Interest 60 only instead of the entire call period is less expensive in terms of computing and timing resources, much faster and substantially more accurate. Thus, for example, a ratio of Region of Interest of 1:10 is possible yet it is less preferred as far as the system's resources than a ratio of Region of Interest of 1:20 or 1:100.

The proposed apparatus and method provide the following capabilities: a) identification of a Region of Interest that should be analyzed. The apparatus could further locate associated Regions of Interest, and infer and act upon the association, b) selection of the optimal analysis type. One non-limiting example is the choice between Word Spotting and Screen Event analysis in case of an interaction where the customer was "put on hold" by an agent and the organization is attempting to clarify the reasons for the agent's action. Word Spotting is an expensive analysis in terms of computer resources whereas screen events, once recorded, are inexpensive to use. Under certain circumstances the performance of the screen events analysis exclusively may be sufficient to clarify the issue, since the screen events typically provide a completely indication regarding the course of the interaction and therefore substantially describe the agent's actions. Under more specific circumstances word spotting should be used either exclusively or in combination with screen sense analysis, c) decision regarding the optimal input to feed into the analysis type selected. Each analysis type yields optimal results when fed with the correct input for a given context. One non-limiting example is the case of an interaction where the customer was "put on hold" by an agent and the organization is attempting to clarify the reasons concerning the agent's action. One potential reason could be the execution of a search for information pages concerning a new promotion performed by the agent in response to a specific request by the customer. A second potential reason could involve the execution of a search for the cancellation policy pages performed by the agent in response to a request by the customer to quit a service. Other like behaviors could be the potential reason for the desire to identify sections in the media to analyze. Optimal performance of Word Spotting analysis requires feeding the word spotting engine the proper set of words in order to provide efficient search within the interaction media. The set of words should be provided in accordance to the context. In the exemplary scenario mentioned above the possible set of words are those that regard an exchange involving either joining a promotion or quitting the service. Via the utilization of the screen event analysis the reason for the exemplary hold event could be identified in real-time and the proper word set could be selected in order to be fed into the word spotting analysis engine.

The apparatus and method of the present invention provide the following advantages: a) Automatic identification of a Region of Interest and associations of Regions of Interest are used to guide the analysis engine to specific segments of an interaction media in order to perform analysis on the specific parts. The capability of selectively analyzing only designated parts of the interaction media in contrast to analyzing the entire interaction media leads to enhanced efficiency in the utilization of the analysis engine. The selective analysis process provides for substantial time-saving, and for very efficient usage of the computing resources. The proposed apparatus and method make it feasible to analyze more relevant media in a given unit of time. The automatic selection of the analysis type to perform and the automatic selection of the inputs for the analysis effect the performance of an analysis that is both more accurate and efficient than currently available methods. The proposed apparatus and method enable the organization to analyze significantly larger relevant volumes of media. The analysis can be applied only to those parts of the media that are the most valuable to the organization.

The proposed method includes and based on two principal method steps: a) Identification of the Region of Interest in the interaction media. The Region of Interest includes the most valuable parts of a media that should be analyzed, b) Identification of the optimal analysis methods used to perform the analysis on the media. The analysis should be performed such that the performance of the analysis is from the "least expensive" to the "most expensive" in terms of demands on the computing and timing resources. For example, CTI data, such as the identification of a "hold" event, a "transfer" event, a "conference call" event, and the like, are available via CTI event capturing in an inexpensive manner, while other data like Word spotting results are substantially expensive to calculate. In order to identify the optimal area for analysis a specific routine is utilized, the steps and the inputs that define the routine are all constructed from the interaction media and associated meta-data, such as but not limited to CTI, CRM, Screen Events, Audio Analysis data, meta-data and the like. The first step of the routine is to define a "Pivot" spot on the media. The pivot spot serves as the preliminary location in the media around which the routine generates the area for analysis. The area around the pivot spot is also referred to as the Region of Interest. The method and apparatus could operate either in a "Static" mode or in an "Adaptive" mode. In the static mode the pivot spot and the steps associated with determining the Region of Interest are predetermined. The pivot spot can be predetermined by the user. This means that the user can indicate via a pointing means on the pivot spot. The user can also respond to a CTI event or like event spotted and determine where the pivot spot should be placed. The apparatus can automatically, based on predetermined rules determine the location of the pivot spot. For example, the apparatus can in response to events (such as CTI, CRM or other) events or other occurrences place the pivot spot along the media. The apparatus can also place the pivot spot in a predetermined proportional spot relative to the location of the triggering event. One non-limiting example is locating the pivot spot 30 seconds downward towards the end of the call after a CTI event. In the adaptive mode the pivot spot or Region of Interest may be predetermined as in the static mode or can be determined as a result of an analysis type operation yielding results which would change during processing of the pivot spot or Region of Interest. According to this mode a predetermined pivot spot or Region of Interest may change once an analysis is performed on the Region of Interest. The dynamic nature of the adaptive mode means that the values discussed above can be reset and changed at any time during the performance of the method associated with the present invention. The pivot spot can be predetermined or defined by any information internal or external to the media including but not limited to CTI, CRM, Screen Events, Audio Analysis data, meta-data and the like. The pivot spot can also be determined by a user of the system or external to the system. The pivot spot can also be predetermined in advance by the apparatus of the present invention. In a non-limiting example, the pivot spot can be created using the following: 1) CTI events: a) "Hold"—Hold is a CTI event in a telephone interaction between a customer and an agent. The hold event is created by the initiation of a "hold the call" whereby the agent puts the caller on hold. The hold event is located in a precise position in time during the interaction and therefore qualifies as a pivot spot, b) "Transfer" event—is a CTI event in a telephone interaction between a customer and an agent. The transfer event is created following an action of the agent regarding the transfer of the call to a different agent. The transfer event is located at a precise position in time during the interaction and therefore qualifies as a pivot spot. 2) Screen Events: a) Status Field of an account: Screen events are based entirely on changes in the graphical structures displayed on the agent's display screen. Screen events may be used for the tagging of specific interactions whenever an event of selection is performed. One other non-limiting example regards the field of account status. During an interaction, whenever the status field is updated a specific field status change event is created. The field status change event is located at a precise position in time regarding the interaction and therefore can be used as a pivot spot. The processing of the event can be in real time or after the event took place as part of a later analysis or examination of such events or an agent's conduct and the like, 3) Audio Analysis Data: a) Emotional section of a call that enables an analysis in order to find the emotional sections therein. The emotional sections are located in a substantially precise point in time and therefore can be used as pivot spots. A non-limiting example of an emotional section regards a scenario wherein a customer is calling the cellular operator company querying the operator concerning the reception of a phone bill in which the charges were substantially higher than the estimate of the customer. An argument could develop and the customer could become upset. Consequently the speech exchanges could involve higher tones, the areas displaying higher tones can be identified by the emotion detection analysis module, marked as "emotional sections" and can be defined as pivot spot, b) position of specific words or phrases in the Word Spotting analysis results; certain words like for example "fraud", "present", "gift" and many other can be identified by the word spotting analysis module, marked and defined as the pivot spot. A given word or a phrase is located in a substantially precise position in time during the interaction and thus could be used as pivot spot. For another example, the point in time where the customer told the agent "I want to cancel my service with you". The located phrase could be used as a pivot spot around which a Region of Interest could be created, c) Text or voice annotations: When a supervisor listens to an interaction in order to evaluate the agent's performance, text or voice annotations could be added at a specific point in the interaction. For example, when the supervisor perceives that the customer is upset with the agent via the identification of high speech tones the point could be marked with an annotation. The annotation marks a point in time during the the interaction and thus can be used as a pivot spot.

The static version of the routine assumes that there is a predefined static set of steps and inputs that the apparatus and method executes. Preferably, in the static mode, the entire set of values associated with the determination of the pivot spot and Region of Interest are known in advance, and no adaptive learning is performed by the apparatus during or after the execution. The operation of the static version of the routine will be demonstrated via the following scenario in which the agent's adherence to a pre-defined script prior to the generation of the "hold" event is analyzed. Step 1: The "hold" event time position is set as the pivot spot in the media. Step 2: The Region of Interest is created by setting the limits of the period to sixty seconds prior to and sixty seconds following the "hold" event. Step 3: Perform Word Spotting analysis with a lexicon of words that correspond to "adherence to script before hold". The instructions and inputs associated with the routine are static. The length of the Region of Interest, the type of the analysis, such as Word Spotting, the analysis inputs, such as the given lexicon of words, are predefined.

Screen events are events identified by a system in response to one or more of the following: actions performed by the agent in association with the use of a system as viewed by the agent on the screen display including but not limited to keyboard press, mouse click, etc.; data entered into all or part (Region Of Interest) of the display or non-displayed window (window might not be in focus); operating system screen related events. Such as the Esc button pressed, etc; pre-defined multi-sequence events. Such as entering the amount in window application A can generate an update in certain reduction field in Application B. Only these dependant occurrences would yield either input or trigger for the analysis process.

In contrast the adaptive version of the apparatus and method makes no pre-analysis assumptions and decisions resulting in the determination of the pivot spot and Region of Interest are made dynamically as the process progresses. The operation of the adaptive version of the apparatus and method will be demonstrated via the following scenario in which the agent's adherence to a pre-defined script prior to the generation of the "hold" event is analyzed. Step 1: The hold event time position is set as the pivot spot in the interaction media. Step 2: The length of the Region of Interest is calculated dynamically in real-time. The calculation could be made in several ways. For example, emotion analysis is performed around the pivot spot set by the hold event, starting from the hold event-start and hold event-end points and progress from the hold event-start in the direction outwardly towards the call start-point and from the hold event-end in a direction outwardly towards the call-end point. The analysis can be performed by selection predetermined sections located immediate adjacent and outwardly to the pivot spot. Once such sections have been analyzed the sections outwardly and adjacent thereto can be analyzed as well. This process can be iterative to cover all, or part of or a predetermined area of the media examined. The analysis can be terminated if a particular section along the path examined fails to display the requested result, such as words or phrases looked for, high tones, specific data or meta-data, CTI events and the like. It will be appreciated by those skilled in the art that various type analysis can be performed on the examined area but that the preferred method would include scaling analysis methods from the less resource expensive to the more resource expensive analysis. The bi-direction progression leads to a marking of a detected area (such as emotional area) around the pivot spot (such as the hold event) that could be the Region of Interest. Alternatively, the Region of Interest could be determined and based on another type of event such as screen events via the exploration of the display screens and screen events prior to and following the hold event. Screen events are an example of events outside the media which can be detected and analyzed in association with the media analyzed on a similar time line axis. Thus, an external resources which is matched to the media is examined to determine either the pivot spot or Region of Interest. Examining specific screens could enable the identification of screen including promotion details, for example. The Region of Interest will be defined as the time frame wherein the specific pages are displayed. Alternatively, the Region of Interest can be determined in accordance with historical data via the calculation of the average size of the Region of Interest based on historical behavior data. Step 3: In order to perform Word Spotting analysis with the optimal lexicon of words corresponding to the Region of Interest, a set of words (lexicon) is selected where the selection is based on the calculation made in step 2.

Step 4: The Word Spotting analysis is performed with the chosen lexicon. The above description is a simplified example of the dynamic behavior. A situation is demonstrated where the limits of the Region of Interest are calculated dynamically, in real-time, based on a relatively "inexpensive" analysis like Emotion Analysis that leads to an efficient activation of the resource intensive Word Spotting analysis. Note should be taken that there is no limitation on the complexity of steps that can be performed to define dynamically the Region of Interest and to decide the optimal analysis type and the optimal inputs.

It will be appreciated that the present invention exploits the difference-factor or the naturally happening feature of the content analysis technology that generates typically a substantial difference between the length of the Region of Interest and the length of the entire interaction media. Thereby the proposed method provides a substantially efficient usage of computing resources and an enhanced efficiency in the analysis process. It would be easily appreciated by one with ordinary skills in the art that by introducing an ingenuous utilization of the above mentioned feature the novelty in the proposed invention is assured.

Figure 3:
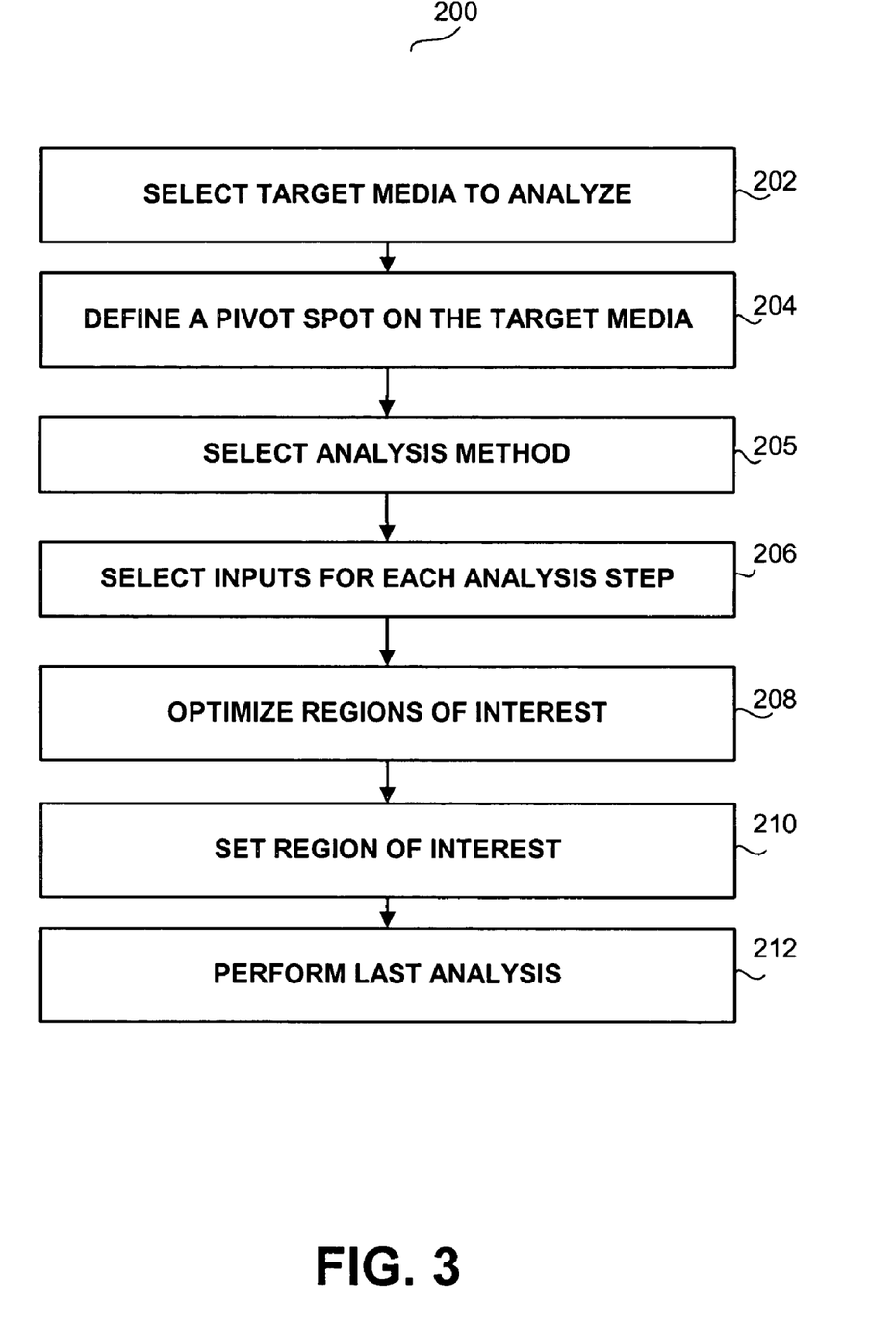
FIG. 3 is a flowchart describing the steps of the proposed method, in accordance with a preferred embodiment of the present invention.

Referring now to FIG. 3 that shows a flowchart 200 that represents the steps of the method of the present invention. At step 202 the target media to be analyzed is selected. The target media could be any type of media, such as, but not limited to audio, video, screen images, email content, chat content, and the like. In the preferred and exemplary embodiment of the invention the media is an audio recording of a telephone conversation representing an interaction between a customer and a call center's agent. The media can be media of an interaction drawn directly from a recording device, such as a video or audio recorder, or stored on a storage device, such as a hard disk, DAT tape and the like.

At step 204 a pivot spot on the target media is defined. Subsequent to the selection of the target media, such as the audio recording, a process is set up to define the limits of the Region of Interest on the interaction media. The pivot spot is the preliminary point of interest around which the Region of Interest is to be defined. The pivot spot can be pre-determined or can be the result of an analysis process. It can be determined by a user or the apparatus of the present invention. The pivot spot can be determined according to the occurrence of an event or the presence of data generated internally or externally to the system or media, as explained above. The pivot spot can be any given point along the media. For example, the user can select a particular time along the media time axis as the pivot spot.

At step 205 the analysis method or apparatus to be used to determine the Region of Interest is selected by the apparatus. One or more analysis methods or apparatuses can be selected to determine the Region of Interest. The preferred analysis methods or apparatuses would be those methods and apparatuses which use less computing power and resources. However, the preferred analysis methods and apparatuses can also be selected according to the media type, the location of the pivot along the media, predetermined selections made by a user or the apparatus of the present invention and the like. The analysis method and apparatus to be used can also be selected based on events of the system, such as CTI events, previous analysis performed on the media or a previous region of interest, partial analysis of one side or one part or part of the media selected, screen events which occurred in association with the selected or other media, and the like. A representative list of the types of analysis methods and apparatuses to be used in determining the Region of Interest was described above in association with the text of FIG. 2. The analysis methods and apparatuses can include, CTI events, Word and Phrase Detection, Emotion Detection, Audio Analysis, Text Analysis, Meta-Data analysis, Screen Events Analysis, DTMF analysis, CRM events and the like. The reference to analysis methods and apparatuses is made as some of the analysis methods can be embedded in the apparatus of the present invention while others can be embedded and performed externally and remotely, also in external apparatuses, to the apparatus of the present invention.

At step 206 the inputs or parameters for the one or more analysis methods and apparatuses to be performed in order to determine the Region on Interest are selected. Every analysis method or apparatus selected or defined in step 205 preferably has a special set of inputs or parameters that will yield the optimal results when fed with the correct inputs for a given context. One non-limiting example refers to an interaction where the customer was put on hold by an agent and the organization is attempting to clarify the reason for the agent's action. One potential reason regards the search of the agent information pages for a new promotion the customer is asking about. A second potential reason could refer to the request of the customer to quit the service and the search of the agent for the cancellation policy pages. The performance of the Word Spotting analysis requires feeding the word spotting engine with a proper set of parameters including but not limited to the proper set of words that are to be searched for in the interaction. Thus, in the context of the present example, the parameters and inputs will be a set of words to be used in association with the Word Spotting analysis module or apparatus. Utilizing the screen analysis the reason could be found for the activation of the hold event and the proper word could be selected in order to be fed into the word spotting analysis engine. In other circumstances different parameters can be used. For example, a specific volume representing high tones voiced by the parties to an interaction can be such parameter. Also, a CRM or CTI events can constitute such parameters. Each analysis method and apparatus will have a set of parameters to be used. The set of parameters or inputs can be fed automatically or manually. Specific analysis modules, methods or apparatuses may have predefined parameters to be used. For example, a table of words can be available to be used in association with the Word Spotting Analysis. The parameters or inputs can be changed by a user, or updated dynamically after each analysis. One non-limiting example would be to add new CTI or CRM events when such are updates, new words to the Word Spotting tables.

At step 208 the Regions of Interest location parameters are determined and optimized. The optimization is performed to accomplish a reduction in size of the Regions of Interest and thereby to ease the operational requirements for critical computing resources. This step is used by the method and apparatus of the present invention when a Region of Interest has been determined by a previous run of the method or on a preliminary and temporary Region of Interest pre-selected for the purpose of optimization. If the method is executed for the first time, and a media for analysis was selected in step 202, a pivot spot was determined in step 204 and analysis modules, methods or apparatus and the respective parameters for their use were determined in steps 206 and 208 a temporary or preliminary Region of Interest is set for the purpose of optimization. Alternatively, if the method is run on the specific media having pivot spot but no defined Region of Interest for the first time, the current step of optimization is skipped. The apparatus provides an option to set a preliminary or temporary Region of Interest for the purpose of optimization. In such case, the Region of Interest is set according to predetermined length. For example, the Region of Interest can be defined as extending 5 seconds to a few minutes outwardly in the directions of the start and end of call. Thus, optimization can be performed on the preliminary Region of Interest. Next, the optimization is performed such that an analysis method consuming relative little or low system resources on the Region of Interest to determine a more accurate Region of Interest on which later more expensive in system resources analysis can be used. The region of the media in which such words are found can later be set as the Region of Interest. If a previous run of the method was executed, and a Region of Interest has been previously defined, then the apparatus of the present can perform additional analysis at this stage to further narrow or better define the limits of the previously selected Region of Interest. As noted above the use of analysis methods requiring low system resources will be preferred, although persons skilled in the art will appreciate that other analysis methods more suitable for optimization of the Region of Interest can be used. Such can include methods for separating speakers, audio analysis, events analysis and external to the media analysis methods such as meta-data, CTI, CRM events and the like.

The present step of optimization can be an optional step and be used to better enhance the performance of the apparatus of the present invention and in order to preserve system resources. However, if it is performed any number of analysis modules, methods or apparatuses can be used. The following list provides such modules, methods or apparatuses, is exemplary only and non-limiting, a) Priority based on events, b) adaptive analysis steps order, c) analyze one side (Agent's) first then the next side (Customer's), d) analyze screen events, e) analyze around CTI events regions, f) analyze around Audio Analysis events regions, g) analyze around text and voice annotations regions, h) analyze designated timeframes: start, end, middle, i) analyze around DTMF events, and j) analyze around CRM events. The order of the instructions of the routine and the type of analysis should be such that the instructions are inexpensive in terms of computing resources are performed first in order to narrow the potential Region of Interest. At step 210 the last analysis is performed.

At step 210 the limits of the Regions of Interest are set. The Region of Interest can be set according to the results obtained in step 208. Such will be a region comprising those events and analysis results which should be further analyzed. For example, if the optimization of a preliminary or previous region of interest identifies high tones at about twenty seconds subsequent to a hold event, the high tones lasting for two minutes, then the location where the high tones end can be defined as one of the extremities of the Region of Interest, while a minute prior to the hold event can be set as the second extremity of the Region of Interest. The apparatus therefore can predefine that the pivot spot always remains within the Region of Interest, or that the pivot spot can be readjusted to a location at the center of the Region of Interest, once it has been determined. Another example is a situation whereby an agent makes a notification on the CRM system in addition to high tones being or specific words being detected. In such exemplary case, the system can determine the CRM update as one end of the Region of Interest and the end of the High tones or spotted words as the other end of the Region of Interest. The system may automatically add any number of seconds or minutes to each end of the Region of Interest for later optimization or that any additional analysis or inspection will be more complete. If optimization has not been performed, then a predetermined Region of Interest can be determined according to rules set within the apparatus. Such can be that the Region of Interest shall extend to a minute in each direction outwardly from the pivot spot. The time to be set can be from a few seconds up to a several minutes or more. The Region of Interest can include a section of the media comprising one or more searched-for results from analysis modules, methods or apparatuses. For example, the Region of Interest can include sections including high tones detected by the Emotions Analysis, words spotted by the Word Spotting, CTI events and the like. It can also include one or more external events such as CRM or Screen events, meta-data and the like.

Subsequent to the completion of all the steps and to the definition of the Region of Interest, an additional analysis can take place. This analysis can be a more expensive in system resources. From this stage an additional optimization can be performed or alternatively, additional analysis can be performed on the Region of Interest. In accordance with the results of each analysis the size of the Region of Interest and optionally the location of the pivot spot can be redefined and relocated. The additional analysis step can be optional, The optimization of the Region of Interest can also be optional.

The present invention proposes a novel method and apparatus for analyzing the media or multi-media content in a selective and efficient manner. In a situation were vast volumes of media should be analyzed the proposed invention provides a routine for selectively analyzing media and using the appropriate analysis tools and inputs in an optimal manner. The organization can analyze more relevant data in a shorter period of time. Accuracy can be improved on several levels. The utilization of the proposed apparatus and method release expensive time and computing resources that can be utilized for a resource intensive analysis that yields enhanced results on the Region of Interest. The Region of Interest concept provides not only a focused area for analysis, but also a focused context in which an entire set of analysis types could be tuned to fit the context rather than act as generic tools.

Next, several non-limiting examples will be provided in order to demonstrate the variety of solutions the proposed apparatus and method provides to an organization in order to assist in the identification of specific problems the indications of which appear in the interactions media generated by the interactions performed within the organization.

In the first example an assistive solution is presented to solve a specific problem regarding the high attrition rate of the customers serviced by an organization. The company is facing a growing number of unsatisfied customers that are either threatening to leave the company or are actually moving to the competition. The urgent business need of the company is to find interactions with indications of churn, such as high emotional levels on the customer side, churn-specific words mentioned by the customer, and low satisfaction indications such as screen events indicating the searching of the agent for cancellation policy pages. A further business need of the company is to create improved processes and to coach agents in order to improve the situation where the improvements and the coaching are based on the results of the interaction media analysis. Based on this data, create improved processes and train agents to improve the situation. A routine is designed and constructed via the utilization of the proposed apparatus and method. The data and analysis types available for us in this case are the following. a) Screen Events, such as an agent is looking at cancellation policy screens, b) Emotional Sections, such as a situation in which a customer is upset, c) Customer is using words and phrases expressing a desire to quit the service and move on to the competition, and d) a CTI hold event is identified following the placing of the customer on hold during the interaction.

The data and analysis types are sequenced in a specific order and direction from the "least expensive" to the "most expensive" in terms of time and computing resource usage. First, the CTI hold event and the screen events of the cancellation policy pages are extracted. These data items require little if any resources since they involve only pulling data out of a database and minor computation. Second, emotion analysis is performed around the position of the hold event and the screen event. Although Emotion analysis requires time and computing resources it is still inexpensive compared to Word Spotting. Third, the emotional section marks the Region of Interest. Last, resource intensive word spotting is performed on the Region of Interest. As at this point it is known that a situation of potential customer attrition exists, Word Spotting engine is fed with corresponding control input, such as a set of words that contains words and phrases related to customer attrition.

A second exemplary scenario concerns customer-interaction rule compliance enforcement in an organization. The managers of the company became conscious of the fact that the customers are getting extremely frustrated when being put on hold during a telephone call, in particular when the participating agent doesn't inform them of his intention in advance. As a result, a specific customer-interaction rule is defined: The agent must get the customer approval to be put on hold and the hold time per call should not exceed two minutes. The company has an urgent business need to find situations were the customer-interaction rule is not followed, clarify the reason for the non-compliance and define ways and means to improve the customer-interaction rule-compliance. In this scenario, the CTI hold event can be used as the pivot spot around which an analysis can be created. The method is directed to analyze X seconds before the capturing of the hold event and Y seconds after the capturing of the hold event. The hold period should not be analyzed. The method analyzes only a minor part of a call period rather than the entire call period. Thereby time effective analysis is achieved. Since a substantially large period of time is saved improved accuracy in terms on contents searched for, detection and false alarm is accomplished.

A third exemplary scenario regards a measuring of the effectiveness of a promotion offer to a customer requesting the termination of the service. The managers of a company have become conscious of the fact that customers in risk of leaving the company can be potentially retained by the offer of a specific promotion. As a result, a customer-interaction rule is defined that requires the agent to offer a specific promotion where the customer threatens to leave the service provided by the company. There is a need for the company to analyze situations where customer expresses frustration and threatens to quit the service. In these cases a promotion is offered and the effectiveness of the offer in retaining the customer is monitored. The Screen events, such as the "promotion offered" event and/or the "account saved/lost" event can be utilized as the pivot spot around which an analysis can be created. We can direct the system to analyze Regions of Interest prior to and following the event. The method could analyze a minute part of a call rather than the entire call period. Other times can be analyzed as well. The time frames for analysis can be changed in accordance with predetermined selections or according to the optimization process described above. The result is time effective analysis as a substantial amount of analysis time is saved. Improved accuracy in terms on contents searched for, detection and false alarm was accomplished.

Although the present invention has been described in accordance with the embodiment shown, one of ordinary skill in the art will readily recognize that there could be variations to the embodiment and those variations would be within the spirit and scope of the present invention. Accordingly, many modifications may be made by one of ordinary skill in the art without departing from the spirit and scope of the appended claims.

The invention claimed is:

1. An apparatus for event-driven content analysis of an audio interaction captured in a call center, within a computerized system having a processing unit and a storage unit, the apparatus comprising the elements of:
    an audio or video recording device for recording the audio interaction and obtaining an interaction media;
    a pivot spot defining component for automatically marking an at least one time position in the audio interaction that indicates the occurrence of an at least one pre-defined event or data item;
    a first audio content analysis component of a first audio content analysis type;
    a region of interest defining component for defining an initial region of interest, by determining the time limits of an at least one segment of the audio interaction, the segment containing the time position of a pivot spot, and for activating the first audio content analysis component on the initial region of interest for dynamically reducing the time limits of the initial region of interest to obtain the region of interest; and
    a second audio content analysis component of a second audio content analysis type different from the first audio content analysis type, for analyzing the region of interest of the audio interaction,
    wherein the first audio content analysis type and the second audio content analysis type are selected such that the second audio content analysis type requires more computing resources than the first audio content analysis type.

2. The apparatus of claim 1 further comprising a content analysis input selector component to determine an at least one input or parameter for the first audio content analysis component or the second audio content analysis component.

3. The apparatus of claim 1 further comprises an analysis type selector component to identify and to select the first audio content analysis component or the second audio content analysis component.

4. The apparatus of claim 1 wherein the first audio content analysis component or the second audio content analysis component is an audio analyzer component for analyzing audio elements of the interaction data.

5. The apparatus of claim 1 wherein the first audio content analysis component or the second audio content analysis component is a computer telephony interface events analyzer component for analyzing at least one computer telephony integration event occurring during the interaction.

6. The apparatus of claim 4 wherein the audio analyzer component further comprises the elements of:
    a word spotting component to locate and identify pre-defined terms or patterns in the speech elements of the interaction data;
    an emotion analysis component to locate and identify positive or negative emotions in the interaction data; and
    a talk analyzer component to identify and locate specific pre-defined speech events in the speech elements of the information data.

7. The apparatus of claim 1 wherein the interaction media comprises at least one data packet carrying voice or other media over internet protocol.

8. The apparatus of claim 1 wherein the region of interest is a specific segment of the interaction media that is analyzed to extract meaningful interaction-specific information in an organization.

9. The apparatus of claim 1 wherein the interaction is associated with an at least one computer telephony integration event occurring during the interaction.

10. The apparatus of claim 1 wherein the pivot spot is determined using at least one item selected from the group consisting of: a Computer Telephony Integration event; a screen event; an emotional level; and a spotted word.

11. The apparatus of claim 1 wherein the first audio content analysis component used for reducing the initial region of interest is selected from the group consisting of: a speaker separation component, emotional level analysis component, word spotting analysis component, audio event analysis component, dual tone mufti frequency (DTMF) event analysis component, and event priority analysis component.

12. The apparatus of claim 1 wherein the captured interaction is between an agent and a customer.

13. The apparatus of claim 1 wherein the at least one pivot spot or the region of interest are determined based on an event external to the interaction.

14. A method for event-driven content analysis, within a computerized system having a processing unit and a storage unit, the method comprising the steps of:
    receiving an audio interaction media between an organization and a customer, the interaction media associated with an at least one event, the interaction media recorded by an audio or video recording device;
    determining an at least one pivot spot, being a time position, on the interaction media;
    determining the time limits of the at least one segment of the interaction media to be analyzed, said limits defining an initial region of interest within the interaction;
    reducing the initial region of interest by performing an at least one first audio content analysis of a first audio content analysis type on the initial region of interest and reducing the initial region of interest in accordance with a result of the at least one first audio content analysis, to obtain a region of interest; and
    performing an at least one second audio content analysis of a second audio content analysis type on the region of interest, wherein the second audio content analysis type is different from the first audio content analysis type and wherein the first audio content analysis type and the second audio content analysis type are selected such that the second audio content analysis type requires more computing resources than the first audio content analysis type.

15. The method of claim 14 further comprising the step of selecting the first audio content analysis or the second audio content analysis is based on the at least one event associated with the interaction.

16. The method of claim 14 further comprising the step of selecting a parameters for the first audio content analysis or the second audio content analysis.

17. The method of claim 14 wherein the region of interest is predetermined by an apparatus.

18. The method of claim 14 further comprises the steps of receiving interaction data and associated meta-data from an at least one interaction.

19. The method of claim 14 wherein the first audio content analysis or the second audio content analysis comprises analyzing speech elements of the interaction data for the presence of pre-defined words or phrases.

20. The method of claim 14 wherein the first audio content analysis or the second audio content analysis comprises analyzing speech elements of the interaction data to detect positive and negative emotions.

21. The method of claim 14 wherein the first audio content analysis or the second audio content analysis comprises analyzing speech elements of the interaction data for pre-defined speech patterns.

22. The method of claim 14 further comprises the steps of
identifying an at least one pre-defined computer telephony integration event in the interaction data; and
identifying an at least one pre-defined screen event in the interaction data.

23. The method of claim 14 further comprises performing an at least one content analysis step during capturing of the interaction data and the interaction meta-data.

24. The method of claim 14 wherein the at least one pivot spot or the region of interest are determined based on an event external to the interaction.

25. The method of claim 14 wherein the pivot spot is determined using at least one item selected from the group consisting of: a Computer Telephony Integration event; a screen event; an emotional level; and a spotted word.

26. The method of claim 14 wherein reducing the initial region of interest is done according to an item selected from the group consisting of: speaker separation, audio analysis, emotional level analysis, word spotting analysis, audio event analysis, DTMF event analysis, and event priority analysis.

27. The method of claim 14 wherein the interaction media captures an interaction between an agent and a customer.

28. The method of claim 14 wherein the method is used for detecting customer churn indications, wherein the pivot spot is defined using a CTI hold event or a cancellation-related screen event; and wherein the region of interest is defined using emotion analysis or word spotting.

29. The method of claim 14 wherein the method is used for verifying that an agent requested a customer's permission to put the customer on hold, wherein the pivot spot is the time the agent put the customer on hold, the initial region of interest is the whole interaction, and wherein the region of interest is defined by a first predetermined number of seconds prior to the pivot spot and a second predetermined number of seconds following the hold.

30. The method of claim 14 wherein the method is used for measuring the effectiveness of a promotion offer to a customer requesting the termination of the service, wherein the pivot spot is the time of a screen event related to offering a promotion or to an account being saved or lost, and wherein the region of interest is defined by a first predetermined number of seconds prior to the pivot spot.

31. The method of claim 14 wherein the reducing step is repeated two or more times.

* * * * *